US010701198B2

(12) United States Patent
Singh et al.

(10) Patent No.: US 10,701,198 B2
(45) Date of Patent: Jun. 30, 2020

(54) AUDIO CALL ANALYSIS

(71) Applicant: QUALCOMM Incorporated, San Diego, CA (US)

(72) Inventors: Avinash Kumar Singh, Hyderabad (IN); Vinay Kumar Ravikanti, Hyderabad (IN); Anuraag Nedunoori, Hyderabad (IN); Krithi Aiyappa, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 27 days.

(21) Appl. No.: 15/942,161

(22) Filed: Mar. 30, 2018

(65) Prior Publication Data

US 2019/0306299 A1 Oct. 3, 2019

(51) Int. Cl.
*H04M 1/725* (2006.01)
*H04M 1/656* (2006.01)
*G10L 25/51* (2013.01)
*G06Q 20/24* (2012.01)
*G06Q 20/26* (2012.01)
*G10L 15/26* (2006.01)
*H04M 1/27457* (2020.01)

(52) U.S. Cl.
CPC ........ *H04M 1/72522* (2013.01); *G06Q 20/24* (2013.01); *G06Q 20/26* (2013.01); *G10L 15/265* (2013.01); *G10L 25/51* (2013.01); *H04M 1/27457* (2020.01); *H04M 1/656* (2013.01); *H04M 2250/68* (2013.01)

(58) Field of Classification Search
CPC .................................................. H04M 1/72522
See application file for complete search history.

(56) References Cited

U.S. PATENT DOCUMENTS

| | | | |
|---|---|---|---|
| 2010/0131529 A1* | 5/2010 | Kasera | G06F 16/9577 707/758 |
| 2010/0291972 A1 | 11/2010 | Gandhi et al. | |
| 2014/0207472 A1* | 7/2014 | Opaluch | G10L 15/265 704/275 |
| 2014/0241514 A1 | 8/2014 | Madhavapeddi et al. | |

FOREIGN PATENT DOCUMENTS

| | | |
|---|---|---|
| CN | 101951432 A | 1/2011 |
| CN | 105049579 A | 11/2015 |
| KR | 20130068922 A | 6/2013 |

* cited by examiner

*Primary Examiner* — Ankur Jain
(74) *Attorney, Agent, or Firm* — Moore IP

(57) ABSTRACT

A device includes a communication interface, an input interface, and a processor. The communication interface is configured to receive an audio signal associated with an audio call. The input interface is configured to receive user input during the audio call. The processor is configured to generate an audio recording of the audio signal in response to receiving the user input. The processor is also configured to generate text by performing speech-to-text conversion of the audio recording. The processor is further configured to perform a comparison of the text to a pattern. The processor is also configured to identify, based on the comparison, a portion of the text that matches the pattern. The processor is further configured to provide the portion of the text and an option to a display. The option is selectable to initiate performance of an action corresponding to the pattern.

30 Claims, 6 Drawing Sheets

AUDIO CALL ANALYSIS

I. FIELD

The present disclosure is generally related to audio call analysis.

II. DESCRIPTION OF RELATED ART

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities. The devices can include communication capabilities, such as the ability make or receive audio calls.

People often exchange information, such as a phone number, during an audio call. With the widespread use of mobile devices, the person receiving the information may be engaged in an activity, such as running or driving, which makes writing down the information difficult. A pen and a piece of paper may not be immediately available to write down the information. In some instances, there is an additional cost associated with having the information sent in a text message subsequent to the phone call. Also, in some locations, text messaging is not supported.

III. SUMMARY

In a particular aspect, a device includes a communication interface, an input interface, and a processor. The communication interface is configured to receive an audio signal associated with an audio call. The input interface is configured to receive user input during the audio call. The processor is configured to generate an audio recording of the audio signal in response to receiving the user input. The processor is also configured to generate text by performing speech-to-text conversion of the audio recording. The processor is further configured to perform a comparison of the text to a pattern. The processor is also configured to identify, based on the comparison, a portion of the text that matches the pattern. The processor is further configured to provide the portion of the text and an option to a display. The option is selectable to initiate performance of an action corresponding to the pattern.

In another particular aspect, a method includes receiving, at a device, an audio signal associated with an audio call. The method also includes receiving, at the device, user input during the audio call. The method further includes generating, at the device, an audio recording of the audio signal in response to receiving the user input. The method also includes generating, at the device, text by performing speech-to-text conversion of the audio recording. The method further includes performing, at the device, a comparison of the text to a pattern. The method also includes identifying, based on the comparison, a portion of the text that matches the pattern. The method further includes providing the portion of the text and an option from the device to a display. The option is selectable to initiate performance of an action corresponding to the pattern.

In another particular aspect, a computer-readable storage device stores instructions that, when executed by a processor, cause the processor to perform operations including receiving an audio signal associated with an audio call. The operations also include receiving user input during the audio call. The operations further include generating an audio recording of the audio signal in response to receiving the user input. The operations also include generating text by performing speech-to-text conversion of the audio recording. The operations further include performing a comparison of the text to a pattern. The operations also include identifying, based on the comparison, a portion of the text that matches the pattern. The operations further include providing the portion of the text and an option to a display. The option is selectable to initiate performance of an action corresponding to the pattern.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Systems and methods of audio call analysis are disclosed. For example, during operation, a device (e.g., a mobile device) generates an audio recording of an audio call, and performs speech-to-text conversion of the audio recording to generate text corresponding to speech of the audio call. The device may extract information from the text. For example, the device is configured to identify a portion of the text that matches a pattern associated with a particular type of information, such as a telephone number pattern.

The device may select an action corresponding to the pattern. In a particular example, the phone number pattern corresponds to an action that includes adding the portion of text as a phone number (e.g., an alternate phone number) to contact information. The device may identify a contact associated with a second device that participated in the audio call. The action may include updating contact information of the identified contact.

The device may provide, to a display (e.g., a touchscreen), an option that is selectable to perform the action (e.g., update the contact information) using the portion of text (e.g., the phone number). In a particular example, the device displays a graphical user interface (GUI) including the option, the portion of text (e.g., the phone number), additional information (e.g., the name of the contact), or a combination thereof. The device is configured to perform the action (e.g., update the contact information to include the phone number) in response to receiving a user selection of the option. The information shared during the audio call is automatically identified and displayed by the device, along with the option to initiate performance of a corresponding action (e.g., updating contact information to save the identified information).

Figure 1:
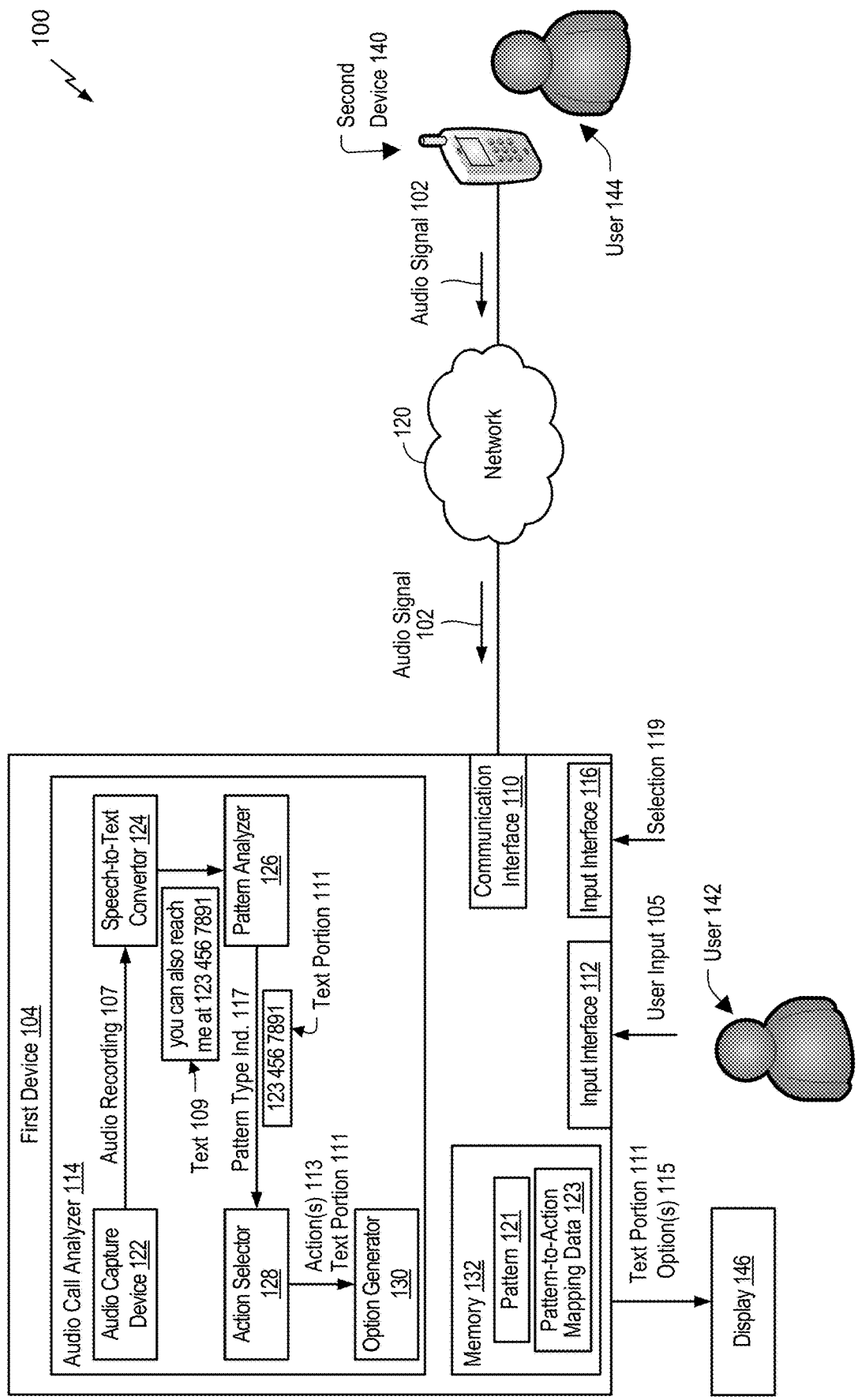
FIG. 1 is a block diagram of a particular illustrative aspect of a system operable to perform audio call analysis.

Referring to FIG. 1, a system operable to perform audio call analysis is disclosed and generally designated 100. The system 100 includes a first device 104 communicatively coupled, via a network 120, to a second device 140. The first device 104 is coupled via a communication interface 110 (e.g., a network interface) to the network 120. The network 120 includes at least one of a cellular network, an internet network, an intranet network, a wired network, or a wireless network. The first device 104 may be coupled to one or more third devices 150. The third device(s) 150 may include a server, a base station, or both. The first device 104 may include a mobile device, a communication device, or both. The second device 140 may include a mobile device, a communication device, or both.

The first device 104 includes at least one input interface, such as an input interface 112, an input interface 116, or both. The input interface 112 may be the same as or distinct from the input interface 116. The input interface 112 is configured to receive user input from a first input device. The first input device includes at least one of a button, a touchscreen, a mouse, a keyboard, or a microphone. The input interface 116 is configured to receive user input from a second input device. The second input device includes at least one of a button, a touchscreen, a mouse, a keyboard, or a microphone. The first input device may be the same as or distinct from the second input device. The first device 104 also includes (or is communicatively coupled to) a display 146. The display 146 includes a touchscreen, a monitor, a television, or another type of display device.

The first device 104 includes a memory 132 configured to store a pattern 121, pattern-to-action mapping data 123, or both. For example, the memory 132 may store data indicating the pattern 121. The pattern 121 may include a telephone number pattern, a physical address pattern, an e-mail address pattern, a bank account number pattern, or a credit card number pattern. The pattern 121 may be associated with a pattern type indicator 117 that indicates a pattern type of the pattern 121. For example, a first value of the pattern type indicator 117 may indicate that the pattern 121 corresponds to a telephone number pattern. The pattern 121 may include one or more regular expressions. For example, the pattern 121 may include a first regular expression corresponding to a first telephone number format (e.g., 10-digit telephone number format), a second regular expression corresponding to a second telephone number format (e.g., 11-digit telephone number format), or both.

The pattern-to-action mapping data 123 may indicate actions corresponding to various pattern types, as further described with reference to FIG. 2. For example, the pattern-to-action mapping data 123 may indicate that a first pattern type (e.g., a telephone number pattern) maps to a first action (e.g., updating contact information to add a corresponding portion of text as a telephone number), a second pattern type (e.g., an e-mail address pattern) maps to a second action (e.g., activating an e-mail application to display a draft e-mail addressed to a corresponding portion of text), or both.

The first device 104 includes an audio call analyzer 114 configured to perform audio call analysis. The audio call analyzer 114 includes an audio capture device 122 coupled, via a speech-to-text convertor 124 and a pattern analyzer 126, to an action selector 128. The action selector 128 is coupled to an option generator 130. The audio capture device 122 is configured to generate an audio recording 107 of an audio signal 102 associated with an audio call and to provide the audio recording 107 to the speech-to-text convertor 124. The speech-to-text convertor 124 is configured to convert the audio recording 107 to text 109 and to provide the text 109 to the pattern analyzer 126. The pattern analyzer 126 is configured to, in response to determining that a portion (e.g., a text portion 111) of the text 109 matches the pattern 121, provide the text portion 111 and the pattern type indicator 117 to the action selector 128. The action selector 128 is configured to determine, based on the pattern-to-action mapping data 123, that the pattern type indicator 117 maps to one or more actions 113. The action selector 128 is configured to provide the action(s) 113 (e.g., data identifying the action(s) 113) and the text portion 111 to the option generator 130. The option generator 130 is configured to generate one or more options 115 selectable to initiate performance of the action(s) 113. The option generator 130 is configured to provide the option(s) 115, the text portion 111, the text 109, or a combination thereof, to the display 146.

During operation, a user 142 may use the first device 104 to participate in an audio call with another user 144 using the second device 140. The communication interface 110 receives the audio signal 102 (e.g., an encoded audio signal) from the second device 140 during the audio call. The audio capture device 122 generates the audio recording 107 of at least a portion of the audio call. For example, the audio recording 107 may correspond to the audio signal 102. In a particular aspect, the audio capture device 122 generates the audio recording 107 by recording the audio signal 102 received by the first device 104 from the second device 140, by recording a second audio signal to be transmitted by the first device 104 to the second device 140 during at least the portion of the audio call, or both.

In a particular aspect, the audio capture device 122 generates the audio recording 107 based on configuration data indicating that at least the portion (e.g., the first 5 minutes) of the audio call is to be recorded. In an alternate aspect, the audio capture device 122 generates the audio recording 107 in response to receiving, via the input interface 112, user input 105 indicating that the audio call is to be recorded. The audio capture device 122 may receive the user input 105 during the audio call. In a particular aspect, the user input 105 indicates that a button has been pressed a particular number of times. In an alternate aspect, the user input 105 corresponds to speech of the user 142 indicating a particular voice command. In a particular aspect, the user input 105 indicates a selection of an option included in a graphical user interface.

The audio capture device 122 may initiate, at a first time, recording of the audio call (e.g., begin generating the audio recording 107) in response to receiving the user input 105. The audio capture device 122 may end, at a second time, recording of the audio call (e.g., complete generating the audio recording 107) in response to receiving a second user input, determining that the audio call is terminated, or determining that a difference between the second time and the first time is greater than a threshold recording duration. The configuration data may indicate the threshold recording duration. The audio recording 107 corresponds to the audio signal 102, the second audio signal sent by the first device 104 to the second device 140, or both, captured between the first time and the second time.

The audio capture device 122 provides the audio recording 107 to the speech-to-text convertor 124, and the speech-to-text convertor 124 generates the text 109 (e.g., " . . . you can also reach me at 123 456 7891 . . . ") corresponding to the audio recording 107 by performing one or more of various speech-to-text conversion techniques. The speech-to-text convertor 124 may provide the text 109 to the pattern analyzer 126. The text 109 may correspond to speech of the audio call. For example, the text 109 may indicate words spoken by the user 144, words spoken by the user 142, or both, during the audio call.

The pattern analyzer 126 extracts information from the text 109. For example, the pattern analyzer 126 compares the text 109 to the pattern 121. The pattern analyzer 126 may determine that the text portion 111 (e.g., "123 456 7891") of the text 109 (e.g., " . . . you can also reach me at 123 456 7891 . . . ") matches the pattern 121 (e.g., a 10-digit telephone number pattern). In a particular aspect, the pattern analyzer 126 determines that the text portion 111 (e.g., "123 456 sen 891") of the text 109 (e.g., " . . . you can also reach me at 123 456 sen 891 . . . ") matches the pattern 121 (e.g., a 10-digit telephone number pattern) in response to determining that the text portion 111 substantially matches the pattern 121. For example, the text portion 111 may include one or more characters (e.g., "sen") that correspond to secondary sounds (e.g., environmental noise), unclear pronunciation of a word (e.g., "seven") by the user 144 or the user 142, a limitation of the speech-to-text convertor 124, or a combination thereof. In a particular example, the pattern analyzer 126 determines that the text portion 111 substantially matches the pattern 121 in response to determining that at least a threshold number of characters in the text portion 111 match the pattern 121. The pattern analyzer 126, in response to determining that the text portion 111 matches the pattern 121, provides the text portion 111, the pattern type indicator 117, or both, to the action selector 128.

The action selector 128 may select the action(s) 113 in response to determining that the pattern-to-action mapping data 123 indicates that the pattern type indicated by the pattern type indicator 117 maps to the action(s) 113, as further described with reference to FIG. 2. For example, if the pattern type indicator 117 has a first value indicating that the pattern 121 corresponds to a first pattern type (e.g., a telephone number pattern), the action(s) 113 may include updating contact information of a contact to add the text portion 111 (e.g., "123 456 7891") as a telephone number. A "contact" corresponds to a record that includes a "contact name" and "contact information." A contact may correspond to a person, a place, a business, or a combination thereof. A contact name of the contact may include an identifier of the person, the place, the business, or a combination thereof. Contact information of the contact may indicate at least a geographical address, an e-mail address, a telephone number, a website, or a social network identifier of the person, the place, the business, or a combination thereof. In an example in which a contact corresponds to a person, the contact includes a contact name indicating at least a first name, a middle name, a last name, a social security number, an employee identifier, or another identifier of the person. The contact may also include an e-mail address, a telephone number, a website, or a social network identifier of the person. A record corresponding to the contact includes the contact name, the contact information, or both, and is stored in a memory, a database, a storage device, or a combination thereof.

In a particular aspect, the action(s) 113 include prompting a user selection of a contact and updating contact information of the user selected contact. In a particular aspect, the action selector 128 identifies a contact based on caller identification (ID) information of the second device 140, and the action(s) 113 include updating the contact information associated with the identified contact. In a particular aspect, the action selector 128 may, in response to selecting the action(s) 113, send a request to the pattern analyzer 126 to determine whether another portion of the text 109 indicates a contact. The pattern analyzer 126 may determine that a second portion of the text 109 (e.g., "me") indicates the contact associated with the caller ID information. The action(s) 113 may include updating the contact information of the indicated contact. The action selector 128 provides an indication to the option generator 130 that the action(s) 113 are selected and correspond to the text portion 111. It should be understood that the text portion 111 corresponding to a 10-digit telephone number pattern and the action(s) 113 including updating contact information are described as illustrative examples. In some examples, the text portion 111 may correspond to a telephone number pattern having another format, a physical address pattern, an e-mail address pattern, a bank account number pattern, a credit card number pattern, or another pattern. The action(s) 113 may include updating various types of data, activating various types of applications, exchanging various types of data with other devices, or a combination thereof.

The option generator 130 generates the option(s) 115 that are selectable to initiate performance of the action(s) 113 based on the text portion 111. For example, a first option of the option(s) 115 may be selectable to initiate performance of a first action of the action(s) 113 based on the text portion 111 (e.g., to update contact information to include a phone number). In a particular example, a second option of the option(s) 115 is selectable to initiate performance of a plurality of the action(s) 113. To illustrate, the second option is selectable to initiate performance of the first action and a second action of the action(s) 113 based on the text portion 111 (e.g., to update the contact information to include the phone number and to send a text message to the phone number). The option generator 130 provides a GUI including the option(s) 115, the text portion 111, or both, to the display 146. The user 142 may select at least one option of the option(s) 115, such as by using the touchscreen to select a graphical element of the GUI. The first device 104 may perform actions corresponding to the selected options. For example, the first device 104 may perform the first action based on the text portion 111 in response to receiving, via the input interface 116, a selection 119 indicating the first option. As another example, the first device 104 may, in response to receiving the selection 119 indicating the second option, perform each of the first action and the second action based on the text portion 111.

The system 100 thus enables identifying information (e.g., the text portion 111) received during an audio call that matches the pattern 121, selecting the action(s) 113 corresponding to the pattern 121, and displaying the option(s) 115 that are selectable to perform the action(s) 113 based on the text portion 111. The option generator 130 may provide the option(s) 115 to the display 146 during or after the audio call. The user 142 may select the option(s) 115 to initiate performance of the action(s) 113. The user 142 does not have to write or remember the information received during the audio call and the corresponding action(s) 113 are automatically identified. Selecting the option(s) 115 to initiate the action 113 may take fewer user interactions and increase user safety, such as while driving. For example, when the user 142 receives a physical address in an audio call while driving, selecting the option(s) 115 to display a corresponding location in a map takes fewer user interactions (e.g., a single user interaction) as compared to having the user 142 trying to remember the address, activating a map application, and typing in the address to display the corresponding location in a map. Reducing a number of user interactions reduces distracted driving and increases driver safety.

It should be understood that although the audio call analyzer 114 is described as including the audio capture device 122, the speech-to-text convertor 124, the pattern analyzer 126, the action selector 128, and the option generator 130, in other examples, one or more of the audio capture device 122, the speech-to-text convertor 124, the pattern analyzer 126, the action selector 128, or the option generator 130 may be external to the first device 104. For example, the third device(s) 150 may include one or more of the speech-to-text convertor 124, the pattern analyzer 126, the action selector 128, or the option generator 130. To illustrate, in an implementation in which the audio capture device 122 is included in a base station, the first device 104, in response to receiving the user input 105, sends a notification to the base station, and the audio capture device 122 generates the audio recording 107 in response to receiving the notification. The third device(s) 150 may be communicatively coupled to the first device 104 and may include a server, a base station, or both. The third device(s) 150 may have more available resources, such as processing cycles, memory, power, or a combination thereof, than the first device 104.

It should be noted that in the following description, various functions performed by the system 100 of FIG. 1 are described as being performed by certain components or modules. However, this division of components and modules is for illustration only. In an alternate aspect, a function performed by a particular component or module may be divided amongst multiple components or modules. Moreover, in an alternate aspect, two or more components or modules of FIG. 1 may be integrated into a single component or module. Each component or module illustrated in FIG. 1 may be implemented using hardware (e.g., a field-programmable gate array (FPGA) device, an application-specific integrated circuit (ASIC), a digital signal processor (DSP), a controller, etc.), software (e.g., instructions executable by a processor), or any combination thereof.

Figure 2:
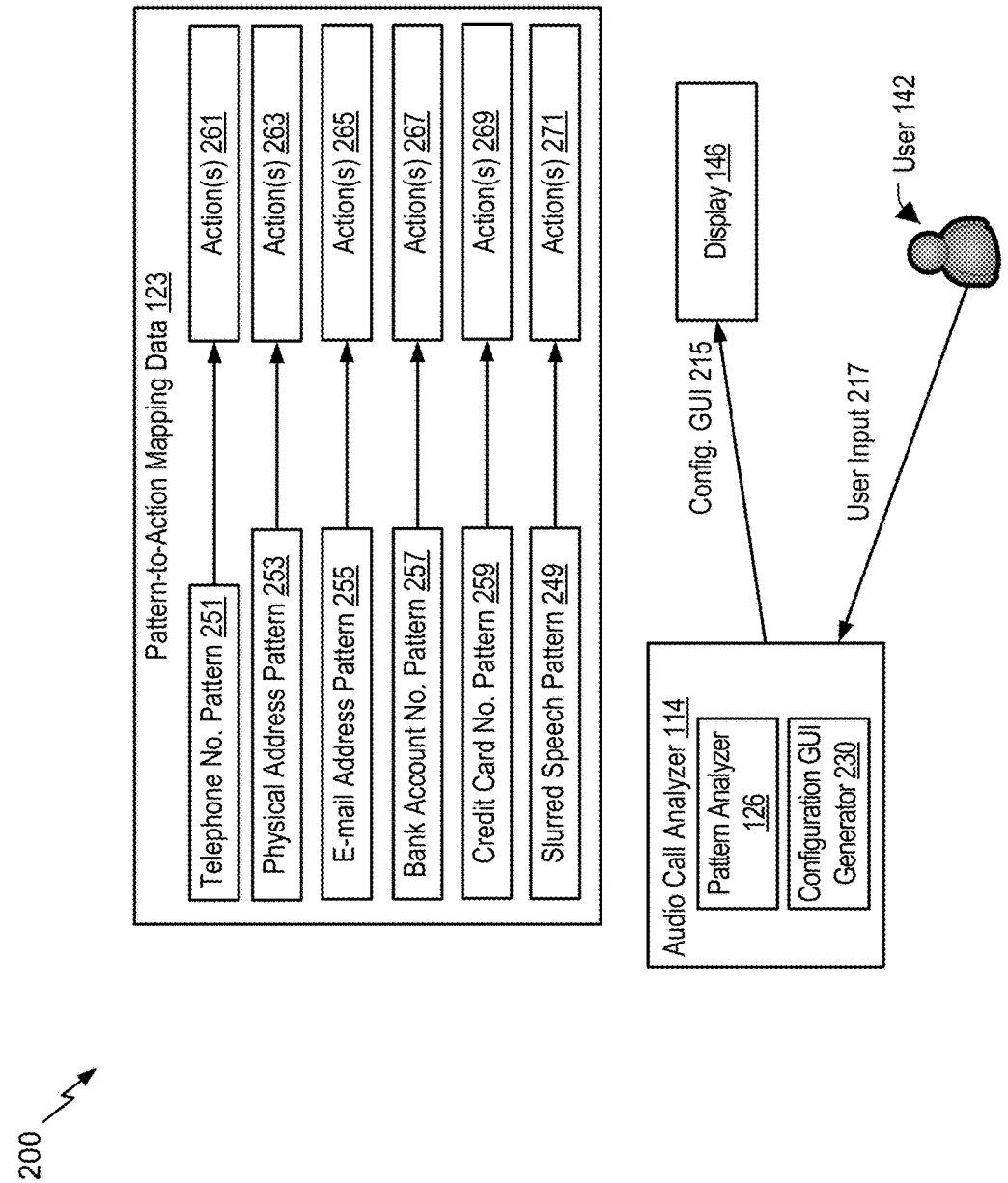
FIG. 2 is a diagram to illustrate particular aspects of the system of FIG. 1.

Referring to FIG. 2, a diagram 200 includes an illustrative example of the pattern-to-action mapping data 123. The pattern-to-action mapping data 123 is depicted as including a telephone number pattern 251, a physical address pattern 253, an e-mail address pattern 255, a bank account number pattern 257, a credit card number pattern 259, and a slurred speech pattern 249. It should be understood that the patterns 249-259 are described as illustrative examples. In other implementations, the pattern-to-action mapping data 123 may include one or more of the patterns 249-259, none of the patterns 249-259, one or more other patterns, or a combination thereof.

The telephone number pattern 251 maps to one or more actions 261. The action(s) 261 may include a first action of updating contact information to include a corresponding portion of text as a contact number. The telephone number pattern 251 may include at least one of a 10-digit phone number pattern, an 11-digit phone number pattern, or another phone number pattern.

The physical address pattern 253 maps to one or more actions 263. The action(s) 263 may include a first action of updating contact information to include a corresponding portion of text as an address, a second action of using a map application to display a location that has an address that is represented by a corresponding portion of text, or both. The physical address pattern 253 may include a number followed by a street name followed by a name of a city or town. In a particular aspect, the pattern analyzer 126 may have access to address data. The physical address pattern 253 may include addresses indicated by the address data. In a particular example, the pattern analyzer 126 may determine that the text portion 111 of FIG. 1 matches the physical address pattern 253 in response to determining that a first portion (e.g., "small city") of the text 109 (e.g., " . . . my address is 123 wide street small city . . . ") of FIG. 1 includes a name of a city and that a second portion (e.g., "123 wide street") of the text 109 includes a street address that the address data indicates is in the city. The pattern analyzer 126 may determine that the text portion 111 (e.g., "123 wide street small city") matches the physical address pattern 253 in response to determining that the text portion 111 includes the first portion and the second portion.

The e-mail address pattern 255 maps to one or more actions 265. The action(s) 265 may include a first action of updating contact information to include a corresponding portion of text as an e-mail address, a second action of activating a communication application (e.g., an e-mail application) to draft an e-mail that includes a corresponding portion of text as an recipient e-mail address, a third action of displaying the e-mail draft to a user to edit, or a combination thereof. In a particular aspect, the e-mail draft may include default text (e.g., "It was wonderful talking to you today. Attached please find the document you requested."). The e-mail address pattern 255 may include text followed by a character (e.g., "@") followed by text followed by a period (e.g., ".") followed by text.

The bank account number pattern 257 maps to one or more actions 267. The action(s) 267 may include a first action of updating contact information to include a corresponding portion of text as an account number, a second action of using an online purchase application to initiate a purchase based on a bank account number, where the bank account number is represented by a corresponding portion of text, or both. The bank account number pattern 257 may include a particular number of digits.

The credit card number pattern 259 maps to one or more actions 269. The action(s) 269 may include a first action of updating contact information to include a corresponding portion of text as a credit card number, a second action of using an online purchase application to initiate a purchase based on a credit card number, where the credit card number is represented by a corresponding portion of text, or both. The credit card number pattern 259 may include a particular number of digits.

The slurred speech pattern 249 maps to one or more actions 271. The action(s) 271 may include a first action of sending an alert to a medical facility, a second action of contacting a particular contact, or both. The slurred speech pattern 249 may identify merged words or partial words. It should be understood that the slurred speech pattern 249 is used as an illustrative example. In other examples, the pattern-to-action mapping data 123 includes patterns that can be used to detect other conditions (e.g., medical conditions) based on analysis of the text 109 of FIG. 1. In a particular aspect, the pattern analyzer 126 may detect a condition that is not readily detectable by the user 142. Displaying the option(s) 115 may inform the user 142 that the condition is detected and enable the user 142 to initiate performance of corresponding actions. The pattern type indicator 117 of FIG. 1 may have a first value, a second value, a third value, a fourth value, a fifth value, or a sixth value to indicate that the pattern 121 of FIG. 1 corresponds to the telephone number pattern 251, the physical address pattern 253, the e-mail address pattern 255, the bank account number pattern 257, the credit card number pattern 259, or the slurred speech pattern 249, respectively.

The diagram 200 also includes the audio call analyzer 114. The audio call analyzer 114 includes a configuration GUI generator 230. The configuration GUI generator 230 is configured to generate a configuration GUI 215 and to provide the configuration GUI 215 to the display 146. For example, the configuration GUI generator 230 may, in response to receiving a user selection of a configuration option, provide the configuration GUI 215 to the display 146. The configuration GUI 215 may display the pattern-to-action mapping data 123. The pattern-to-action mapping data 123 may be editable in the configuration GUI 215. For example, the user 142 may provide user input 217 to the configuration GUI generator 230 and the configuration GUI generator 230 may update, based on the user input 217, one or more of the patterns 249-259, one or more of the actions 261-271, or a combination thereof. For example, the user input 217 may indicate that the e-mail address pattern 255 maps to a first action. The configuration GUI generator 230 may, in response to receiving the user input 217, add the first action to the action(s) 265.

Figure 3:
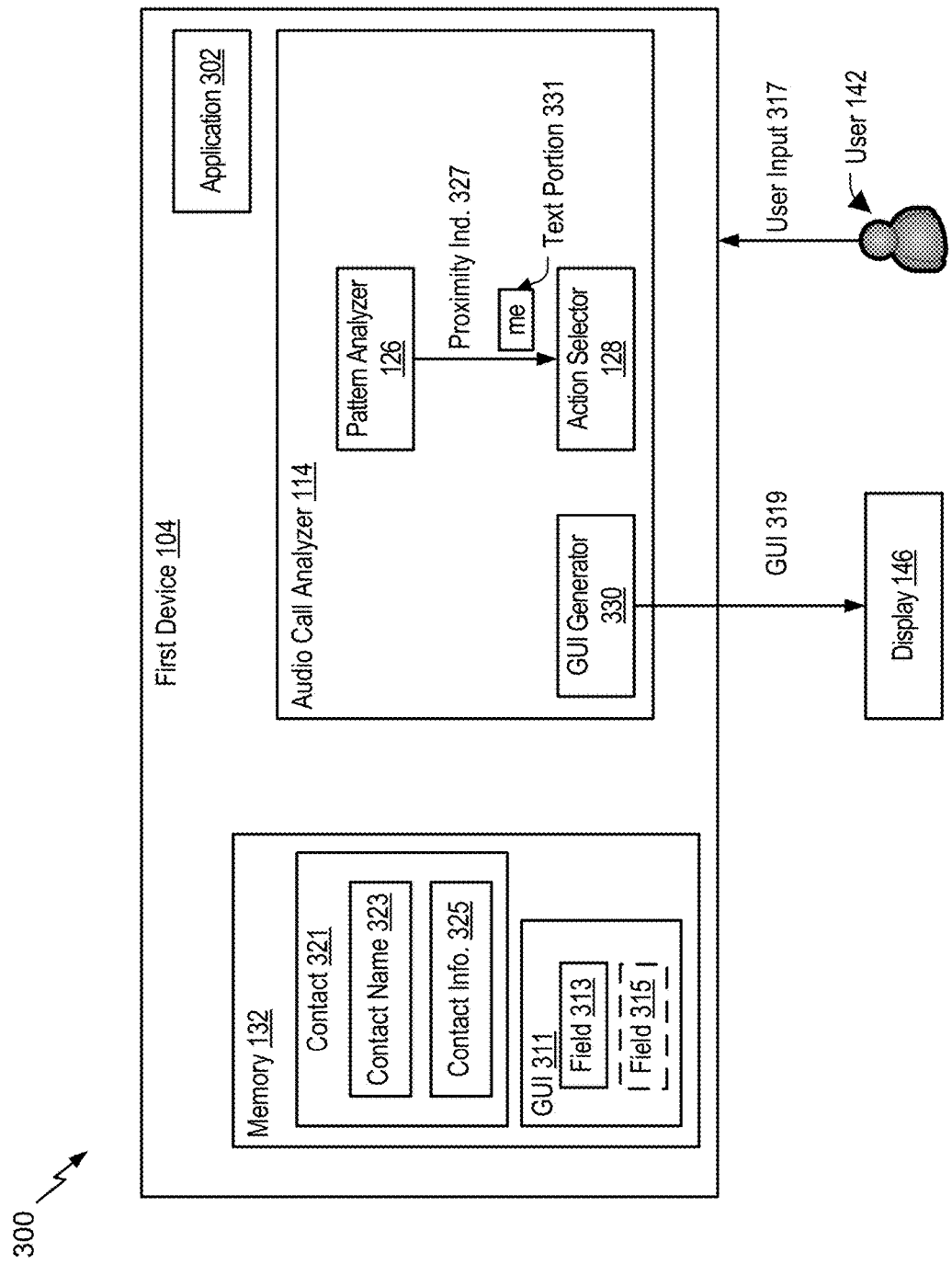
FIG. 3 is a diagram to illustrate particular aspects of a system operable to perform audio call analysis.

Referring to FIG. 3, a system operable to perform audio call analysis is shown and generally designated 300. In some implementations, the system 300 corresponds to the system 100 of FIG. 1 and includes one or more components of the system 100.

In the implementation depicted in FIG. 3, the audio call analyzer 114 includes a GUI generator 330. The GUI generator 330 is configured to generate a GUI 319 including the option(s) 115, the text portion 111, or a combination thereof. For example, the GUI generator 330 is configured to generate the GUI 319 in response to receiving the option(s) 115, the text portion 111, or a combination thereof, from the option generator 130 of FIG. 1. The pattern analyzer 126 is configured to select a text portion 331 of the text 109 of FIG. 1 and to generate a proximity indicator 327 indicating proximity of the text portion 331 to the text portion 111 in the text 109.

During operation, the pattern analyzer 126 may, in response to receiving the text 109 from the speech-to-text convertor 124, determine that the text portion 111 matches the pattern 121, as described with reference to FIG. 1. The pattern analyzer 126 determines that the text portion 331 appears to indicate a contact name. For example, the pattern analyzer 126 may determine that the text portion 331 appears to indicate a contact name in response to determining that the text portion 331 matches a particular word included in a list of words (e.g., "me"), a list of names (e.g., first names, last names, business names, etc.), or both. The pattern analyzer 126 may generate the proximity indicator 327 indicating a distance between the text portion 331 and the text portion 111 in the text 109. For example, the proximity indicator 327 may indicate a number of characters between the text portion 331 and the text portion 111, a number of words between the text portion 331 and the text portion 111, or both. The pattern analyzer 126 provides the proximity indicator 327, the text portion 331, or both, to the action selector 128. For example, the pattern analyzer 126 may provide the proximity indicator 327 and the text portion 331 to the action selector 128 in addition to providing the text portion 111 and the pattern type indicator 117 to the action selector 128.

The action selector 128 selects the action(s) 113 corresponding to the pattern 121, as described with reference to FIG. 1. The action selector 128 may determine that at least one of the action(s) 113 is based on a contact, such as the at least one action includes updating (or generating) contact information. The action selector 128 may, in response to determining that at least one of the action(s) is based on a contact, determine whether the proximity indicator 327 satisfies (e.g., is less than or equal to) a proximity threshold (e.g., a threshold number of characters or words). The action selector 128 may, in response to determining that the proximity indicator 327 satisfies the proximity threshold, provide the text portion 331 to the option generator 130.

The option generator 130 may provide the text portion 331 to the display 146. For example, the option generator 130 may provide the text portion 111, the option(s) 115, the text portion 331, or a combination thereof, to the display 146. A first option of the option(s) 115 may be selectable to initiate performance of a first action of the action(s) 113 based on the text portion 111 and the text portion 331. For example, the first option may be selectable to update contact information 325 of a contact 321 to include the text portion 111, where the contact 321 has a contact name 323 corresponding to the text portion 331 or where the text portion 331 corresponds to a word (e.g., "me") that is associated with the user 144 during the audio call.

In a particular aspect, the option generator 130 provides the text portion 331, the text portion 111, the option(s) 115, or a combination thereof, to the GUI generator 330. The GUI generator 330 generates the GUI 319 in response to receiving the text portion 331, the text portion 111, the option(s) 115, or a combination thereof. The GUI 319 includes the option(s) 115 and a field 313 indicating the text portion 111. The GUI 319 may also include a field 315 indicating the text portion 331. The field 313, the field 315, or both, may be editable fields. The GUI generator 330 may provide the GUI 319 to the display 146.

The first device 104 may receive user input 317 from the user 142. For example, the first device 104 may receive the user input 317 in addition to the selection 119 indicating a particular option of the option(s) 115. The user input 317 may include a first value (e.g., an updated value) of the field 313, a second value (e.g., an updated value) of the field 315, or both, such as input the user 142 to correct one or more inaccuracies (e.g., to change "Main Street" to "Mane Street").

The first device 104, in response to receiving the selection 119 and the user input 317, performs one or more actions corresponding to the particular option based on the first value, the second value, or both. For example, the first device 104 may, in response to determining that the second value does not correspond to an existing contact, generate a new contact (e.g., the contact 321) having the second value as the contact name 323. Alternatively, the first device 104 may select the contact 321 in response to determining that the second value corresponds to the contact 321. For example, the first device 104 selects the contact 321 based on determining that the second value matches (e.g., is similar to) at least a portion (e.g., a first name, a middle name, or a last name) of the contact name 323.

The first device 104 may perform the one or more actions based on the contact 321, the first value, or both. For example, an action of the action(s) 113 includes activating an application 302 (e.g., a map application). The first device 104 may activate the application 302 based on the first value (or the text portion 111). To illustrate, the text portion 111 matches the physical address pattern 253 of FIG. 2, and the first device 104, in response to receiving the selection 119 indicating an option corresponding to an action, uses the application 302 to display a map of a physical location with an address corresponding to the first value (or the text portion 111) as a location associated with the contact 321. In a particular example, the first device 104 may update the contact information 325 to include the first value. The contact information 325 is updated based at least in part on determining that the contact information 325 is associated with the contact name 323 that is similar to the second value (or the text portion 331). The first device 104 may thus update the contact information 325 of the contact 321 based on the audio signal 102 of FIG. 1, the user input 317, or both. The contact 321 may be the same as or different from a contact indicated by the text portion 331.

The system 300 thus enables identification of the contact 323 based on speech of the audio call. For example, the contact 323 may be identified based on the text portion 331 corresponding to a portion of the audio call. Selecting the option(s) 115 to initiate the action(s) 113 associated with the contact 323 identified based on the audio call may take fewer interactions as compared to the user 142 providing user input identifying the contact 323 and selecting an option to perform an action associated with the contact 323. Reducing a number of user interactions reduces distracted driving and increases driver safety.

Figure 4:
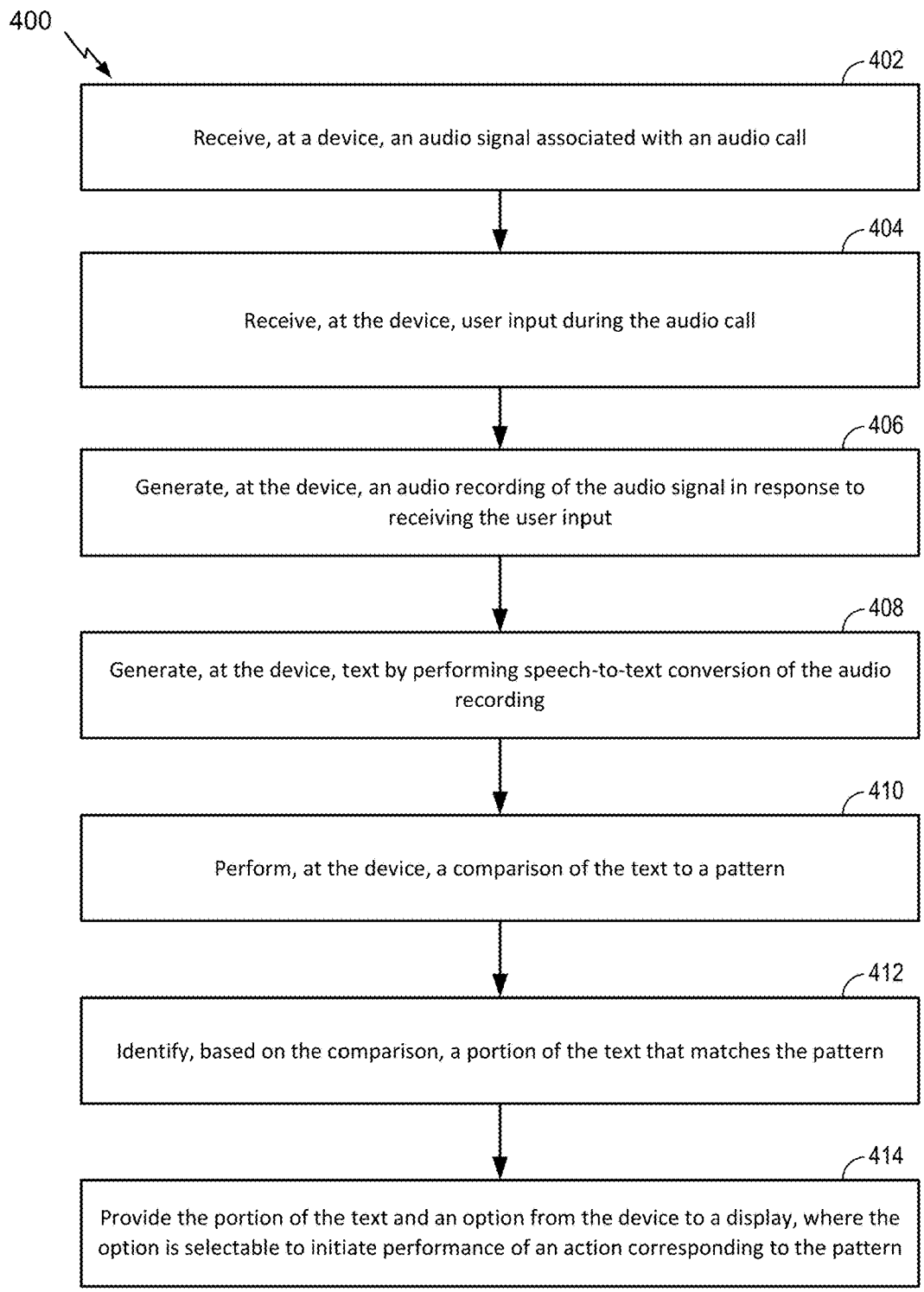
FIG. 4 is a flow chart to illustrate an aspect of a method of performing audio call analysis.

Referring to FIG. 4, a method of operation is shown and generally designated 400. The method 400 may be performed by the first device 104, the audio call analyzer 114, the audio capture device 122, the speech-to-text convertor 124, the pattern analyzer 126, the action selector 128, the option generator 130, or a combination thereof.

The method 400 includes receiving, at a device, an audio signal associated with an audio call, at 402. For example, the first device 104 of FIG. 1 may receive the audio signal 102 associated with an audio call, as described with reference to FIG. 1.

The method 400 also includes receiving, at the device, user input during the audio call, at 404. For example, the first device 104 of FIG. 1 may receive the user input 105 during the audio call, as described with reference to FIG. 1.

The method 400 further includes generating, at the device, an audio recording of the audio signal in response to receiving the user input, at 406. For example, the audio capture device 122 of FIG. 1 may generate the audio recording 107 of the audio signal 102 in response to receiving the user input 105, as described with reference to FIG. 1.

The method 400 also includes generating, at the device, text by performing speech-to-text conversion of the audio recording, at 408. For example, the speech-to-text convertor 124 of FIG. 1 may generate the text 109 by performing speech-to-text conversion of the audio recording 107, as described with reference to FIG. 1.

The method 400 further includes performing, at the device, a comparison of the text to a pattern, at 410. For example, the pattern analyzer 126 of FIG. 1 may perform a comparison of the text 109 to the pattern 121, as described with reference to FIG. 1.

The method 400 also includes identifying, based on the comparison, a portion of the text that matches the pattern, at 412. For example, the pattern analyzer 126 of FIG. 1 may identify the text portion 111 that matches the pattern 121, as described with reference to FIG. 1.

The method 400 further includes providing the portion of the text and an option from the device to a display, at 414. For example, the option generator 130 of FIG. 1 may provide the text portion 111 and the option(s) 115 to the display 146, as described with reference to FIG. 1. The option(s) 115 are selectable to initiate performance of the action(s) 113 of FIG. 1 corresponding to the pattern 121.

The method 400 may thus enable identifying information (e.g., the text portion 111) received during an audio call that matches the pattern 121, selecting the action(s) 113 corresponding to the pattern 121, and displaying the option(s) 115 that are selectable to perform the action(s) 113 based on the text portion 111. The option generator 130 may provide the option(s) 115 to the display 146 during or after the audio call. The user 142 of FIG. 1 may select the option(s) 115 to initiate performance of the action(s) 113. The user 142 does not have to write or remember the information received during the audio call and the corresponding action(s) 113 are automatically identified.

Figure 5:
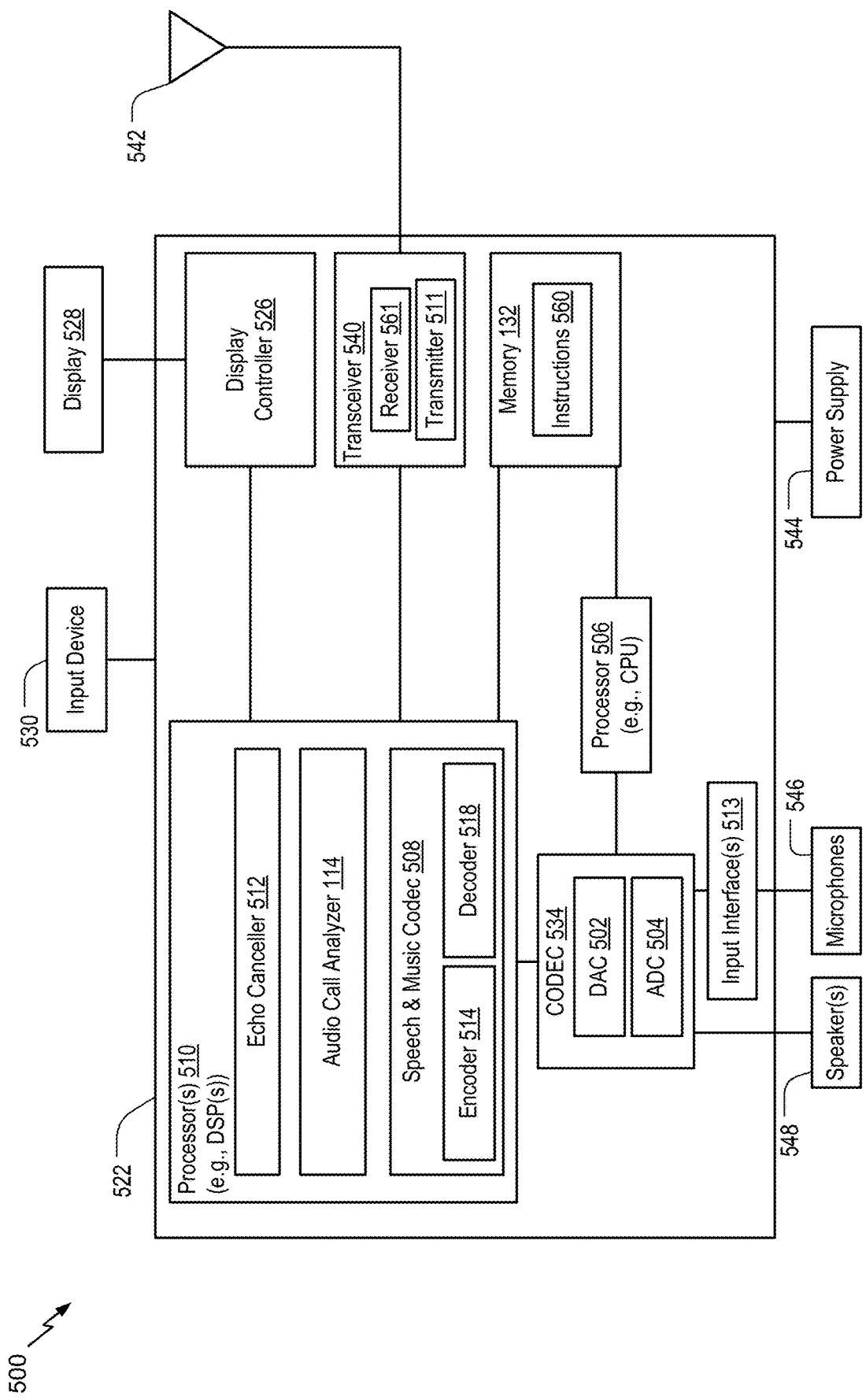
FIG. 5 is a block diagram of a device operable to perform audio call analysis in accordance with the systems and methods of FIGS. 1-4.

Referring to FIG. 5, a block diagram of a particular illustrative example of a device (e.g., a wireless communication device) is depicted and generally designated 500. In various aspects, the device 500 may have fewer or more components than illustrated in FIG. 5. In an illustrative aspect, the device 500 may correspond to the first device 104 of FIG. 1. In an illustrative aspect, the device 500 may perform one or more operations described with reference to systems and methods of FIGS. 1-4.

In a particular aspect, the device 500 includes a processor 506 (e.g., a central processing unit (CPU)). The device 500 may include one or more additional processors 510 (e.g., one or more digital signal processors (DSPs)). The processors 510 may include a media (e.g., speech and music) coderdecoder (CODEC) 508, and an echo canceller 512. The media CODEC 508 may include a decoder 518, an encoder 514, or both. The processors 510 may include the audio call analyzer 114. In a particular aspect, the media codec 508 includes the audio call analyzer 114.

The device 500 includes the memory 132 and a CODEC 534. The CODEC 534 may include a digital-to-analog converter (DAC) 502 and an analog-to-digital converter (ADC) 504. Although the media CODEC 508 and the audio call analyzer 114 are illustrated as components of the processors 510 (e.g., dedicated circuitry and/or executable programming code), in other aspects one or more components of the media CODEC 508, the audio call analyzer 114, or both, such as the decoder 518, the encoder 514, or both, may be included in the processor 506, the CODEC 534, another processing component, or a combination thereof. In a particular aspect, the processors 510, the processor 506, the CODEC 534, or another processing component performs one or more operations described herein as performed by the audio call analyzer 114. In a particular aspect, operations described herein as performed by the audio call analyzer 114 are performed by one or more processors included in the audio call analyzer 114.

The device 500 may include a transceiver 540 coupled to an antenna 542. The transceiver 540 may include a transmitter 511, a receiver 561, or both. The transceiver 540 may be coupled to the communication interface 110 of FIG. 1. The device 500 may include the display 146 coupled to a display controller 526. One or more speakers 548 may be coupled to the CODEC 534. One or more microphones 546 may be coupled, via an input interface(s) 513, to the CODEC 534. In a particular implementation, the input interface(s) 513 includes the input interface 112, the input interface 116 of FIG. 1, or both.

The memory 132 may include instructions 560 executable by the processor 506, the processors 510, the CODEC 534, another processing unit of the device 500, or a combination thereof, to perform one or more operations described with reference to FIGS. 1-4.

One or more components of the device 500 may be implemented via dedicated hardware (e.g., circuitry), by a processor executing instructions to perform one or more tasks, or a combination thereof. As an example, the memory 132 or one or more components of the processor 506, the processors 510, and/or the CODEC 534 may be a memory device, such as a random access memory (RAM), magnetoresistive random access memory (MRAM), spin-torque transfer MRAM (STT-MRAM), flash memory, read-only memory (ROM), programmable read-only memory (PROM), erasable programmable read-only memory (EPROM), electrically erasable programmable read-only memory (EEPROM), registers, hard disk, a removable disk, or a compact disc read-only memory (CD-ROM). The memory device may include instructions (e.g., the instructions 560) that, when executed by a computer (e.g., a processor in the CODEC 534, the processor 506, and/or the processors 510), may cause the computer to perform one or more operations described with reference to FIGS. 1-4. As an example, the memory 132 or the one or more components of the processor 506, the processors 510, and/or the CODEC 534 may be a non-transitory computer-readable medium that includes instructions (e.g., the instructions 560) that, when executed by a computer (e.g., a processor in the CODEC 534, the processor 506, and/or the processors 510), cause the computer perform one or more operations described with reference to FIGS. 1-4.

In a particular aspect, the device 500 may be included in a system-in-package or system-on-chip device (e.g., a mobile station modem (MSM)) 522. In a particular aspect, the processor 506, the processors 510, the display controller 526, the memory 132, the CODEC 534, and the transceiver 540 are included in a system-in-package or the system-on-chip device 522. In a particular aspect, an input device 530, such as a touchscreen and/or keypad, and a power supply 544 are coupled to the system-on-chip device 522. In a particular implementation, the input device 530 is coupled to the input interface 112, the input interface 116 of FIG. 1, or both. Moreover, in a particular aspect, as illustrated in FIG. 5, the display 146, the input device 530, the speakers 548, the microphones 546, the antenna 542, and the power supply 544 are external to the system-on-chip device 522. However, each of the display 146, the input device 530, the speakers 548, the microphones 546, the antenna 542, and the power supply 544 can be coupled to a component of the system-on-chip device 522, such as an interface or a controller. The device 500 may include a wireless telephone, a mobile device, a mobile communication device, a mobile phone, a smart phone, a cellular phone, a wireless phone, a laptop computer, a desktop computer, a computer, a tablet computer, a set top box, a personal digital assistant (PDA), a display device, a television, a game console, a music player, a radio, a video player, an entertainment unit, a communication device, a fixed location data unit, a personal media player, a digital video player, a digital video disc (DVD) player, a tuner, a camera, a navigation device, a decoder system, an encoder system, or any combination thereof.

In conjunction with the described implementations, an apparatus includes means for receiving an audio signal associated with an audio call. For example, the means for receiving the audio signal may include the communication interface 110, the first device 104 of FIG. 1, the receiver 561, the transceiver 540, the antenna 542, the device 500 of FIG. 5, one or more devices configured to receive an audio signal, or a combination thereof.

The apparatus also includes means for receiving user input during the audio call. For example, the means for receiving the user input may include the input interface 112, the first device 104 of FIG. 1, the input interface(s) 513, the device 500 of FIG. 5, one or more devices configured to receive user input during an audio call, or a combination thereof.

The apparatus further includes means for generating an audio recording of the audio signal and identifying a portion of text that matches a pattern. For example, the means for generating the audio recording and identifying the portion of text may include the audio capture device 122, the speech-to-text convertor 124, the pattern analyzer 126, the audio call analyzer 114, the first device 104 of FIG. 1, the processors 510, the processor 506, the CODEC 534, the device 500, one or more devices configured to generate an audio recording and identify a portion of text that matches a pattern (e.g., a processor executing instructions that are stored at a computer-readable storage device), or a combination thereof. The audio recording 107 of FIG. 1 is generated in response to receiving the user input 105, as described with reference to FIG. 1. The text 109 of FIG. 1 is generated by performing speech-to-text conversion of the audio recording 107, as described with reference to FIG. 1.

The apparatus also includes means for displaying the portion of the text and an option that is selectable to initiate performance of an action. For example, the means for displaying the portion of the text and the option may include the display 146, the first device 104 of FIG. 1, the display 528, the device 500, one or more devices configured to display a portion of text and an option that is selectable to initiate performance of an action, or a combination thereof. The action(s) 113 of FIG. 1 may correspond to the pattern 121, as described with reference to FIG. 1.

It should be noted that various functions performed by the one or more components of the systems and devices disclosed herein are described as being performed by certain components or modules. This division of components and modules is for illustration only. In an alternate implementation, a function performed by a particular component or module is divided amongst multiple components or modules. Moreover, in an alternate implementation, two or more components or modules are integrated into a single component or module. Each component or module may be implemented using hardware (e.g., a field-programmable gate array (FPGA) device, an application-specific integrated circuit (ASIC), a DSP, a controller, etc.), software (e.g., instructions executable by a processor), or any combination thereof.

Figure 6:
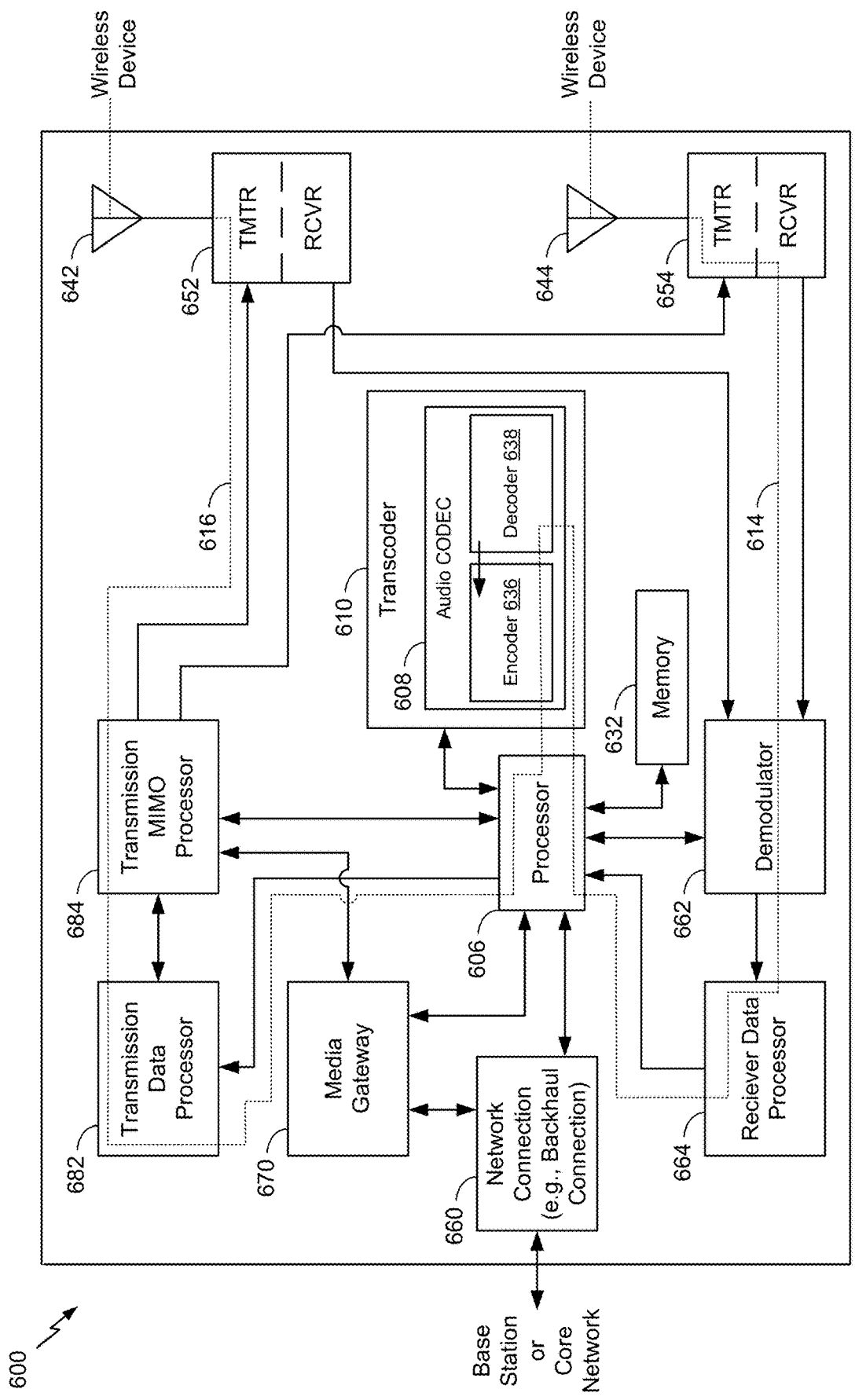
FIG. 6 is a block diagram of a base station operable to perform audio call analysis in accordance with the systems and methods of FIGS. 1-5.

Referring to FIG. 6, a block diagram of a particular illustrative example of a base station 600 is depicted. In various implementations, the base station 600 may have more components or fewer components than illustrated in FIG. 6. In an illustrative example, the base station 600 includes the first device 104, one of the third device(s) 150 of FIG. 1, or a combination thereof. In an illustrative example, the base station 600 performs one or more operations described with reference to FIGS. 1-5.

The base station 600 may be part of a wireless communication system. The wireless communication system may include multiple base stations and multiple wireless devices. The wireless communication system may be a Long Term Evolution (LTE) system, a Code Division Multiple Access (CDMA) system, a Global System for Mobile Communications (GSM) system, a wireless local area network (WLAN) system, or some other wireless system. A CDMA system may implement Wideband CDMA (WCDMA), CDMA 1×, Evolution-Data Optimized (EVDO), Time Division Synchronous CDMA (TD-SCDMA), or some other version of CDMA.

The wireless devices may also be referred to as user equipment (UE), a mobile station, a terminal, an access terminal, a subscriber unit, a station, etc. The wireless devices may include a cellular phone, a smartphone, a tablet, a wireless modem, a personal digital assistant (PDA), a handheld device, a laptop computer, a smartbook, a netbook, a tablet, a cordless phone, a wireless local loop (WLL) station, a Bluetooth device, etc. The wireless devices may include or correspond to the device 500 of FIG. 5.

Various functions may be performed by one or more components of the base station 600 (and/or in other components not shown), such as sending and receiving messages and data (e.g., audio data). In a particular example, the base station 600 includes a processor 606 (e.g., a CPU). The base station 600 may include a transcoder 610. The transcoder 610 may include an audio CODEC 608 (e.g., a media CODEC). For example, the transcoder 610 may include one or more components (e.g., circuitry) configured to perform operations of the audio CODEC 608. As another example, the transcoder 610 may be configured to execute one or more computer-readable instructions to perform the operations of the audio CODEC 608. Although the audio CODEC 608 is illustrated as a component of the transcoder 610, in other examples one or more components of the audio CODEC 608 may be included in the processor 606, another processing component, or a combination thereof. For example, a decoder 638 (e.g., a vocoder decoder) may be included in a receiver data processor 664. As another example, an encoder 636 (e.g., a vocoder encoder) may be included in a transmission data processor 682.

The transcoder 610 may function to transcode messages and data between two or more networks. The transcoder 610 may be configured to convert message and audio data from a first format (e.g., a digital format) to a second format. To illustrate, the decoder 638 may decode encoded signals having a first format and the encoder 636 may encode the decoded signals into encoded signals having a second format. Additionally or alternatively, the transcoder 610 may be configured to perform data rate adaptation. For example, the transcoder 610 may downconvert a data rate or upconvert the data rate without changing a format the audio data. To illustrate, the transcoder 610 may downconvert 64 kbit/s signals into 16 kbit/s signals.

The audio CODEC 608 may include the encoder 636 and the decoder 638. The audio CODEC 608 may include one or more of the audio capture device 122, the speech-to-text convertor 124, the pattern analyzer 126, the action selector 128, or the option generator 130 of FIG. 1.

The base station 600 may include a memory 632. The memory 632, such as a computer-readable storage device, may include instructions. The instructions may include one or more instructions that are executable by the processor 606, the transcoder 610, or a combination thereof, to perform one or more operations described with reference to FIGS. 1-5. The base station 600 may include multiple transmitters and receivers (e.g., transceivers), such as a first transceiver 652 and a second transceiver 654, coupled to an array of antennas. The array of antennas may include a first antenna 642 and a second antenna 644. The array of antennas may be configured to wirelessly communicate with one or more wireless devices, such as the device 500 of FIG. 5. For example, the second antenna 644 may receive a data stream 614 (e.g., a bit stream) from a wireless device. The data stream 614 may include messages, data (e.g., encoded speech data), or a combination thereof.

The base station 600 may include a network connection 660, such as backhaul connection. The network connection 660 may be configured to communicate with a core network or one or more base stations of the wireless communication network. For example, the base station 600 may receive a second data stream (e.g., messages or audio data) from a core network via the network connection 660. The base station 600 may process the second data stream to generate messages or audio data and provide the messages or the audio data to one or more wireless device via one or more antennas of the array of antennas or to another base station via the network connection 660. In a particular implementation, the network connection 660 may be a wide area network (WAN) connection, as an illustrative, non-limiting example. In some implementations, the core network may include or correspond to a Public Switched Telephone Network (PSTN), a packet backbone network, or both.

The base station 600 may include a media gateway 670 that is coupled to the network connection 660 and the processor 606. The media gateway 670 may be configured to convert between media streams of different telecommunications technologies. For example, the media gateway 670 may convert between different transmission protocols, different coding schemes, or both. To illustrate, the media gateway 670 may convert from PCM signals to Real-Time Transport Protocol (RTP) signals, as an illustrative, non-limiting example. The media gateway 670 may convert data between packet switched networks (e.g., a Voice Over Internet Protocol (VoIP) network, an IP Multimedia Subsystem (IMS), a fourth generation (4G) wireless network, such as LTE, WiMax, and UMB, etc.), circuit switched networks (e.g., a PSTN), and hybrid networks (e.g., a second generation (2G) wireless network, such as GSM, GPRS, and EDGE, a third generation (3G) wireless network, such as WCDMA, EV-DO, and HSPA, etc.).

Additionally, the media gateway 670 may include a transcoder, such as the transcoder 610, and may be configured to transcode data when codecs are incompatible. For example, the media gateway 670 may transcode between an Adaptive Multi-Rate (AMR) codec and a G.711 codec, as an illustrative, non-limiting example. The media gateway 670 may include a router and a plurality of physical interfaces. In some implementations, the media gateway 670 may also include a controller (not shown). In a particular implementation, the media gateway controller may be external to the media gateway 670, external to the base station 600, or both. The media gateway controller may control and coordinate operations of multiple media gateways. The media gateway 670 may receive control signals from the media gateway controller and may function to bridge between different transmission technologies and may add service to end-user capabilities and connections.

The base station 600 may include a demodulator 662 that is coupled to the transceivers 652, 654, the receiver data processor 664, and the processor 606, and the receiver data processor 664 may be coupled to the processor 606. The demodulator 662 may be configured to demodulate modulated signals received from the transceivers 652, 654 and to provide demodulated data to the receiver data processor 664. The receiver data processor 664 may be configured to extract a message or audio data from the demodulated data and send the message or the audio data to the processor 606.

The base station 600 may include a transmission data processor 682 and a transmission multiple input-multiple output (MIMO) processor 684. The transmission data processor 682 may be coupled to the processor 606 and the transmission MIMO processor 684. The transmission MIMO processor 684 may be coupled to the transceivers 652, 654 and the processor 606. In some implementations, the transmission MIMO processor 684 may be coupled to the media gateway 670. The transmission data processor 682 may be configured to receive the messages or the audio data from the processor 606 and to code the messages or the audio data based on a coding scheme, such as CDMA or orthogonal frequency-division multiplexing (OFDM), as an illustrative, non-limiting examples. The transmission data processor 682 may provide the coded data to the transmission MIMO processor 684.

The coded data may be multiplexed with other data, such as pilot data, using CDMA or OFDM techniques to generate multiplexed data. The multiplexed data may then be modulated (i.e., symbol mapped) by the transmission data processor 682 based on a particular modulation scheme (e.g., Binary phase-shift keying ("BPSK"), Quadrature phase-shift keying ("QSPK"), M-ary phase-shift keying ("M-PSK"), M-ary Quadrature amplitude modulation ("M-QAM"), etc.) to generate modulation symbols. In a particular implementation, the coded data and other data may be modulated using different modulation schemes. The data rate, coding, and modulation for each data stream may be determined by instructions executed by the processor 606.

The transmission MIMO processor 684 may be configured to receive the modulation symbols from the transmission data processor 682 and may further process the modulation symbols and may perform beamforming on the data. For example, the transmission MIMO processor 684 may apply beamforming weights to the modulation symbols. The beamforming weights may correspond to one or more antennas of the array of antennas from which the modulation symbols are transmitted.

During operation, the second antenna 644 of the base station 600 may receive a data stream 614. The second transceiver 654 may receive the data stream 614 from the second antenna 644 and may provide the data stream 614 to the demodulator 662. The demodulator 662 may demodulate modulated signals of the data stream 614 and provide demodulated data to the receiver data processor 664. The receiver data processor 664 may extract audio data from the demodulated data and provide the extracted audio data to the processor 606.

The processor 606 may provide the audio data to the transcoder 610 for transcoding. The decoder 638 of the transcoder 610 may decode the audio data from a first format into decoded audio data and the encoder 636 may encode the decoded audio data into a second format. In some implementations, the encoder 636 may encode the audio data using a higher data rate (e.g., upconvert) or a lower data rate (e.g., downconvert) than received from the wireless device. In other implementations the audio data may not be transcoded. Although transcoding (e.g., decoding and encoding) is illustrated as being performed by a transcoder 610, the transcoding operations (e.g., decoding and encoding) may be performed by multiple components of the base station 600. For example, decoding may be performed by the receiver data processor 664 and encoding may be performed by the transmission data processor 682. In other implementations, the processor 606 may provide the audio data to the media gateway 670 for conversion to another transmission protocol, coding scheme, or both. The media gateway 670 may provide the converted data to another base station or core network via the network connection 660.

The decoder 638 and the encoder 636 may select a corresponding decoder (e.g., a speech decoder or a non-speech decoder) and a corresponding encoder to transcode (e.g., decode and encode) the frame. The decoder 638 and the encoder 636 may determine, on a frame-by-frame basis, whether each received frame of the data stream 614 corresponds to a narrowband frame or a wideband frame and may select a corresponding decoding output mode (e.g., a narrowband output mode or a wideband output mode) and a corresponding encoding output mode to transcode (e.g., decode and encode) the frame. Encoded audio data generated at the encoder 636, such as transcoded data, may be provided to the transmission data processor 682 or the network connection 660 via the processor 606.

The transcoded audio data from the transcoder 610 may be provided to the transmission data processor 682 for coding according to a modulation scheme, such as OFDM, to generate the modulation symbols. The transmission data processor 682 may provide the modulation symbols to the transmission MIMO processor 684 for further processing and beamforming. The transmission MIMO processor 684 may apply beamforming weights and may provide the modulation symbols to one or more antennas of the array of antennas, such as the first antenna 642 via the first transceiver 652. Thus, the base station 600 may provide a transcoded data stream 616, that corresponds to the data stream 614 received from the wireless device, to another wireless device. The transcoded data stream 616 may have a different encoding format, data rate, or both, than the data stream 614. In other implementations, the transcoded data stream 616 may be provided to the network connection 660 for transmission to another base station or a core network.

In the transcoder 610, the audio capture device 122 may generate an audio recording (e.g., the audio recording 107 of FIG. 1) in response to receiving the user input 105 (or a notification based on the user input 105). The speech-to-text convertor 124 may generate the text 109. The pattern analyzer 126 may generate the text portion 111. The action selector 128 may output the action(s) 113, the text portion 111, or a combination thereof. The option generator 130 may output the option(s) 115, the text portion 111, or a combination thereof. The base station 600 may transmit the option(s) 115, the text portion 111, or a combination thereof, along with the audio signal 102 to the first device 104 for display at the display 146.

The base station 600 may therefore include a computer-readable storage device (e.g., the memory 632) storing instructions that, when executed by a processor (e.g., the processor 606 or the transcoder 610), cause the processor to perform operations including receiving an audio signal associated with an audio call. The operations also include receiving user input during the audio call. The operations further include generating an audio recording of the audio signal in response to receiving the user input. The operations also include generating text by performing speech-to-text conversion of the audio recording. The operations further include performing a comparison of the text to a pattern. The operations also include identifying, based on the comparison, a portion of the text that matches the pattern. The operations further include providing the portion of the text and an option to a display. The option is selectable to initiate performance of an action corresponding to the pattern.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A device comprising:
a communication interface configured to receive an audio signal associated with an audio call;
one or more input interfaces configured to receive user input during the audio call; and
a processor configured to:
generate an audio recording of the audio signal in response to receiving first user input via the one or more input interfaces;
generate text by performing speech-to-text conversion of the audio recording;
perform a comparison of the text to a pattern;
identify, based on the comparison, a portion of the text that matches the pattern; and
provide, to a display, a graphical user interface that includes:
the portion of the text in an editable field;
an option that is selectable to initiate performance of an action corresponding to the pattern and based on content in the editable field of the graphical user interface;
receive second user input via the one or more input interfaces, the second user input indicating an updated value of the editable field; and
in response to receipt of selection of the option, perform the action based on the updated value of the editable field, the updated value distinct from the portion of the text.

2. The device of claim 1, wherein the pattern includes a telephone number pattern, a physical address pattern, an e-mail address pattern, a bank account number pattern, or a credit card number pattern.

3. The device of claim 1, further comprising a memory configured to store contact information, wherein the action includes updating the contact information to include the portion of the text.

4. The device of claim 3, wherein the pattern includes a telephone number pattern.

5. The device of claim 3, wherein the processor is further configured to determine that a second portion of the text indicates a contact name, wherein the contact information is updated based at least in part on determining that the contact information is associated with the contact name.

6. The device of claim 5, wherein the contact information is updated based on determining that the second portion of the text is within a threshold number of characters from the portion of the text.

7. The device of claim 1, wherein the pattern includes a physical address pattern, wherein the action includes using a map application to display a location in a map, and wherein the location is based on a physical address represented by the portion of the text.

8. The device of claim 1, wherein the pattern includes a credit card number pattern, wherein the action includes using an online purchase application to initiate a purchase based on a credit card number, and wherein the credit card number is represented by the portion of the text.

9. The device of claim 1, wherein the pattern includes a bank account number pattern, wherein the action includes using an online purchase application to initiate a purchase based on a bank account number, and wherein the bank account number is represented by the portion of the text.

10. The device of claim 1, wherein the one or more input interfaces are configured to receive the user input from a microphone, a touchscreen, a button, a mouse, or a keyboard.

11. The device of claim 1, further comprising:
an antenna; and
a receiver coupled to the antenna and configured to receive the audio signal, wherein the communication interface includes the receiver.

12. The device of claim 11, wherein the antenna, the communication interface, the one or more input interfaces, and the processor are integrated into a mobile device.

13. The device of claim 11, wherein the antenna, the communication interface, the one or more input interfaces, and the processor are integrated into a base station.

14. The device of claim 1, wherein the pattern includes an e-mail address pattern, wherein the action includes using an e-mail application to display a draft of an e-mail that includes an e-mail address in a recipient field, and wherein the e-mail address is represented by the portion of the text.

15. The device of claim 1, wherein the processor is a component of a tablet computer, a laptop computer, or a desktop computer.

16. A method comprising:
receiving, at a device, an audio signal associated with an audio call;
receiving, at the device, user input during the audio call;
generating, at the device, an audio recording of the audio signal in response to receiving the user input;
generating, at the device, text by performing speech-to-text conversion of the audio recording;
performing, at the device, a comparison of the text to a pattern;
identifying, based on the comparison, a portion of the text that matches the pattern;
providing, from the device to a display:
the portion of the text in an editable field; and
an option that is selectable to initiate performance of an action corresponding to the pattern and based on content in the editable field;
receiving, at the device, second user input indicating an updated value of the editable field; and
in response to receiving a selection of the option, performing the action based on the updated value of the editable field, wherein the updated value is distinct from the portion of the text.

17. The method of claim 16, further comprising:
prior to the audio call, receiving third user input indicating that the pattern corresponds to the action; and
generating, based on the third user input, pattern-to-action mapping data to indicate that the pattern corresponds to the action; and
selecting the action to provide to the display in response to determining that the pattern-to-action mapping data indicates that the pattern corresponds to the action.

18. The method of claim 16, wherein the portion of the text and the option are included in a graphical user interface (GUI) provided to the display, and wherein the portion of the text is displayed during the audio call.

19. The method of claim 16, wherein the pattern corresponds to a physical address pattern, and wherein the action corresponds to use of a map application to display a location corresponding to the updated value in a map.

20. The method of claim 16, wherein the device comprises a mobile device.

21. A computer-readable storage device storing instructions that, when executed by a processor, cause the processor to perform operations comprising:
 receiving an audio signal associated with an audio call;
 receiving user input during the audio call;
 generating an audio recording of the audio signal in response to receiving the user input;
 generating text by performing speech-to-text conversion of the audio recording;
 performing a comparison of the text to a pattern;
 identifying, based on the comparison, a portion of the text that matches the pattern; and
 providing, to a display, a graphical user interface that includes:
  the portion of the text in an editable field;
  an option that is selectable to initiate performance of an action corresponding to the pattern and based on content in the editable field of the graphical user interface;
 receiving second user input indicating an updated value of the editable field; and
 in response to receiving a selection of the option, performing the action based on the updated value of the editable field, the updated value distinct from the portion of the text.

22. The computer-readable storage device of claim 21, wherein the operations further comprise providing a plurality of options to the display, the plurality of options selectable to initiate performance of a plurality of actions based on the content in the editable field of the graphical user interface, wherein the plurality of actions include the action.

23. The computer-readable storage device of claim 22, wherein the operations further comprise, in response to receiving a selection of one or more options of the plurality of options, initiating performance of one or more corresponding actions.

24. The computer-readable storage device of claim 21, wherein the pattern corresponds to a physical address pattern, wherein the action includes using a map application to display a location in a map, and wherein the location is based on a physical address represented by the portion of the text.

25. The computer-readable storage device of claim 24, wherein the operations further comprise:
 providing a second option to the display, the second option selectable to initiate performance of a second action corresponding to the pattern, wherein the second action includes updating contact information to include the physical address; and
 in response to receiving second user input indicating that each of the option and the second option is selected, initiating performance of the action and the second action.

26. The computer-readable storage device of claim 21, wherein the operations further comprise:
 determining that a second portion of the text indicates a contact name; and
 providing the contact name to the display in a second editable field of the graphical user interface.

27. The computer-readable storage device of claim 26, wherein the action comprises:
 selecting a contact corresponding to a value of the second editable field;
 selecting contact information corresponding to the contact; and
 updating the contact information to indicate the portion of the text.

28. The computer-readable storage device of claim 26, wherein the action comprises, in response to determining that a value of the second editable field does not correspond to an existing contact, generating a contact having contact information that indicates the portion of the text.

29. An apparatus comprising:
 means for receiving an audio signal associated with an audio call;
 means for receiving user input during the audio call;
 means for generating an audio recording of the audio signal and identifying a portion of text that matches a pattern, the audio recording generated in response to receiving first user input via the means for receiving user input, wherein the text is generated by performing speech-to-text conversion of the audio recording;
 means for displaying the portion of the text in an editable field of a graphical user interface and an option that is selectable to initiate performance of an action, the action corresponding to the pattern and based on content in the editable field of the graphical user interface; and
 means for performing the action, the means for performing the action configured to perform the action in response to receipt of second user input and a selection of the option via the means for receiving user input, wherein the second user input indicates an updated value of the editable field distinct from the portion of the text, and wherein the action is performed based on the updated value of the editable field.

30. The apparatus of claim 29, wherein the means for receiving the audio signal, the means for receiving the user input, the means for generating the audio recording and identifying the portion of the text, and the means for displaying the portion of the text and the option are integrated into a communication device, a personal digital assistant (PDA), a computer, a music player, a video player, an entertainment unit, a navigation device, a mobile device, a fixed location data unit, or a set top box.

\* \* \* \* \*